United States Patent [19]
Wick et al.

[11] 3,975,410
[45] Aug. 17, 1976

[54] PROCESS FOR THE MANUFACTURE OF HALOGEN-CONTAINING ANTHRAQUINOIDAL COMPOUNDS, THEIR USE AND NEW HALOGEN-CONTAINING ANTHRAQUINOIDAL COMPOUNDS

[75] Inventors: Arnold Wick, Therwil; Max Jost, Oberwil, both of Switzerland

[73] Assignee: Ciba-Geigy Corporation, Ardsley, N.Y.

[22] Filed: Sept. 27, 1974

[21] Appl. No.: 509,877

[30] Foreign Application Priority Data
Oct. 10, 1973   Switzerland.................. 14393/73

[52] U.S. Cl. ............................. 260/376; 8/39 B; 260/370; 260/372; 260/381; 260/384
[51] Int. Cl.² ....................................... C07C 49/68
[58] Field of Search.................. 260/381, 376, 384; 8/39 B

[56] References Cited
UNITED STATES PATENTS

| | | | |
|---|---|---|---|
| 2,128,178 | 8/1938 | Dettwyler .......................... | 260/381 |
| 2,226,909 | 12/1940 | Peter.................................. | 260/381 |
| 2,236,672 | 4/1941 | Coffey et al. ...................... | 260/376 |
| 3,316,280 | 4/1967 | Vollman et al. ................... | 260/381 |
| 3,378,572 | 4/1968 | Wilder ............................... | 260/384 |
| 3,530,151 | 9/1970 | Hoare ................................ | 260/381 |
| 3,642,837 | 2/1972 | Greenhalgh et al. .............. | 260/381 |
| 3,797,995 | 3/1974 | Renfrew et al. ................... | 260/381 |
| 3,836,549 | 9/1974 | Yamada ............................. | 8/39 B |
| 3,842,101 | 10/1974 | Graser ............................... | 8/39 |

FOREIGN PATENTS OR APPLICATIONS
1,552,923   12/1968   France

*Primary Examiner*—Arthur P. Demers
*Attorney, Agent, or Firm*—Vincent J. Cavalieri

[57] ABSTRACT

Process for the manufacture of halogen-containing anthraquinoidal compounds being useful for bulk dyeing high molecular organic compounds and having the formula

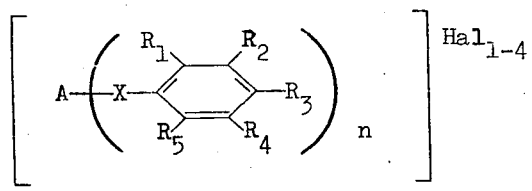

wherein A is an anthraquinoidal radical being free from nitro groups, X is —NH— or —S—, n is a number of 1 to 4. $R_1$ to $R_5$ is hydrogen, halogen, alkyl, alkoxy, aryloxy, aroyl or arylsulphonyl, and Hal is halogen, by halogenating compounds of the formula

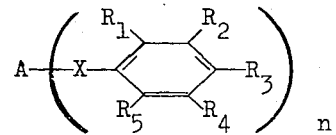

2 Claims, No Drawings

PROCESS FOR THE MANUFACTURE OF HALOGEN-CONTAINING ANTHRAQUINOIDAL COMPOUNDS, THEIR USE AND NEW HALOGEN-CONTAINING ANTHRAQUINOIDAL COMPOUNDS

It has been disclosed in numerous patent specifications that colouring substances of the anilinoanthraquinone or arylmercapto-anthraquinone series, of the general formula

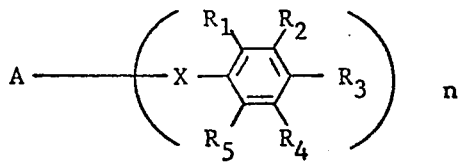

wherein A denotes a simple anthraquinoidal radical or an anthraquinoidal radical which is optionally further substituted or is more highly condensed, X denotes a —NH— or —S— group, $n$ denotes an integer from 1 to 4, and $R_1$ to $R_5$ denote hydrogen and/or substituents of the most diverse kind, such as alkyl, aralkyl, aryl, alkoxy, aryloxy, arylamino, hydroxyalkoxy, alkylcarboxylate, arylketo, arylsulphonyl or nitro groups or halogen atoms, the groups

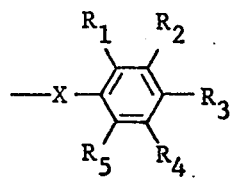

being preferably in α-positions of the anthraquinone radical, are suitable for the bulk dyeing of polymeric materials such as polystyrene, polymethacrylate, polyamide and particularly polyesters.

Particularly in the bulk dyeing of polyesters, the colouring substances mentioned frequently still exhibit various defects in regard to their properties of application and fastness, such as insufficient fastness to light chlorite, dry cleaning or sublimation, but, in particular, frequently insufficient fastness to rubbing after the dyed material has been thermofixed. Also, they often dye only in dull shades of a weak colour.

It has now been found that new, halogenated anthraquinoidal dyestuffs of the formula I

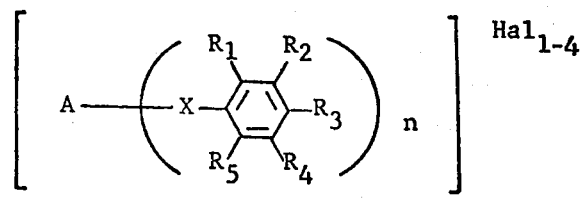

wherein A denotes an anthraquinoidal radical which is free from nitro groups, X denotes a —NH— or —S— bridge, $n$ denotes a number from 1 to 4, $R_1$ to $R_5$ denote substituents of the group hydrogen, halogen, alkyl, alkoxy, aryloxy, aroyl or arylsulphonyl, and Hal denotes halogen, particularly bromine, and, if $n = 1$, the group

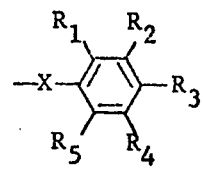

represents a radical containing at least two phenyl nuclei, or A denotes an anthraquinoidal radical which is more highly condensed, for example an isothiazolanthrone, pyrazolanthrone, anthrapyrimidine or anthrapyridone radical, are obtained if compounds of the formula II

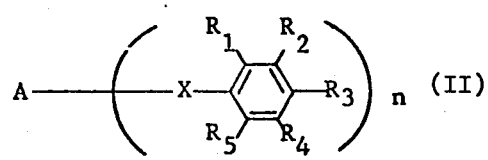

wherein A, $x$, $n$ and $R_1$ to $R_5$ have the above meaning, are treated with halogenating agents.

$R_1$ to $R_5$ are preferably composed of substituents of the following group: hydrogen, chlorine, bromine, alkyl having 1 to 4 C atoms, alkoxy having 1 to 4 C atoms, phenoxy, diphenylyloxy, naphthyloxy, benzoyl, p-phenylbenzoyl, phenylsulphonyl or diphenylylsulphonyl.

The halogenation is carried out by methods which are generally known. Halogenating agents which can be used are elementary halogen, such as chlorine and, particularly, bromine, or compounds which can transmit active halogen, such as sulphuryl chloride or thionyl chloride.

The colouring substance to be halogenated is preferably suspended or dissolved for this purpose in a diluent such as water, sulphuric acid or particularly an organic solvent, for example chlorobenzene, o-dichlorobenzene, trichlorobenzene and particularly nitrobenzene, and is treated, in the temperature range of from —10° to 150°C, preferably 20° – 60°C, with the halogenating agent, optionally in the presence of a halogenation catalyst such as iodine or an iron salt.

The following may be particularly mentioned as anilinoanthraquinone derivatives or phenylmercapto-anthraquinone derivatives to be halogenated:

α-Phenylaminoanthraquinones of the formula III

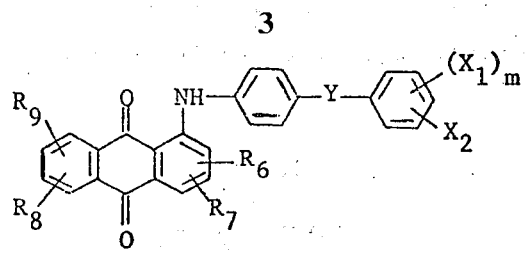

(III)

wherein Y denotes an O or S atom, or a —CO— or —SO$_2$— group, X$_1$ and X$_2$ denote hydrogen, alkyl, aryl, alkyloxy or aryloxy, and R$_6$ – R$_9$ represent hydrogen, halogen, hydroxyl, amino, alkoxy, phenoxy, arylamino, arylmercapto or benzoylamino in the α- or β-position of the anthraquinone radical, and m represents the number 1 to 3.

Y preferably denotes a —CO— group, X$_1$ denotes hydrogen or a methyl or ethyl group, X$_2$ denotes hydrogen or a propyl, butyl, methoxy, ethoxy, phenyl, naphthyl or phenoxy group, R$_6$ and R$_7$ denote hydrogen, and R$_8$ and R$_9$ denote substituents in the 5- and 8-position, to be precise hydrogen, methoxy, phenoxy, phenylmercapto or benzoylamino groups, and m denotes the number 1 to 3.

The following examples of these may be mentioned: 1-(4'-diphenylylamino)-anthraquinone, 1-(4'-phenoxyanilino)-anthraquinone, 1-(4'-phenylaminoanilino)-anthraquinone, 1-(4'-benzoylanilino)-anthraquinone, 1-(4'-benzylanilino)-anthraquinone, 1-(4',4''-phenylbenzoylanilino)-anthraquinone, 1-(4',4''-methylbenzoylanilino)-anthraquinone, 1-(4',4''-phenoxybenzoylanilino)-anthraquinone, 1-(4'-phenylsulphonylanilino)-anthraquinone, 1-(4',4''-diphenylsulphonylanilino)-anthraquinone, 1-(4'-diphenylylamino)-5,8-dihydroxyanthraquinone, 1-(4'-phenoxyanilino)-5,8-dihydroxyanthraquinone, 1-(4'-phenylaminoanilino)-5,8-dihydroxyanthraquinone, 1-(4'-benzoylanilino)-5,8-dihydroxyanthraquinone, 1-(4'-benzylanilino)-5,8-dihydroxyanthraquinone, 1-(4',4''-phenylbenzoylanilino)-5,8-dihydroxyanthraquinone, 1-(4',4''-methylbenzoylanilino)-5,8-dihydroxyanthraquinone, 1-(4',4''-phenoxybenzoylanilino)-5,8-dihydroxyanthraquinone, 1-(4'-phenylsulphonylanilino)-5,8-dihydroxyanthraquinone, 1-(4',4''-diphenylylsulphonylanilino)-5,8-dihydroxyanthraquinone, 1-(4'-diphenylylamino)-4-anilinoanthraquinone, 1-(4'-phenoxyanilino)-4-anilinoanthraquinone, 1-(4'-phenylaminoanilino)-4-anilinoanthraquinone, 1-(4'-benzoylanilino)-4-anilinoanthraquinone, 1-(4'-benzylanilino)-4-anilinoanthraquinone, 1-(4',4''-phenylbenzoylanilino)-4-anilinoanthraquinone, 1-(4',4''-methylbenzoylanilino)-4-anilinoanthraquinone, 1-(4',-4''-phenoxybenzoylanilino)-4-anilinoanthraquinone, 1-(4'-phenylsulphonylanilino)-4-anilinoanthraquinone, 1-(4',4''-diphenylylsulphonylanilino)-4-anilinoanthraquinone, 1-(4'-diphenylylamino)-4,5- or 8-phenylmercaptoanthraquinone, 1-(4'-phenoxyanilino)-4,5- or 8-phenylmercaptoanthraquinone, 1-(4'-benzoylanilino)-4,5- or 8-phenylmercaptoanthraquinone, 1-(4'-benzylanilino)-4,5- or 8-phenylmercaptoanthraquinone, 1-(4',4''-phenylbenzoylanilino)-4,5- or 8-phenylmercaptoanthraquinone, 1-(4',4''-methylbenzoylanilino)-4,5- or 8-phenylmercaptoanthraquinone, 1-(4',4''-phenoxybenzoylanilino)-4,5- or 8-phenylmercaptoanthraquinone, 1-(4'-phenylsulphonylanilino)-4,5- or 8-phenylmercaptoanthraquinone, 1-(4',4''-diphenylylsulphonylanilino)-4,5- or 8-phenylmercaptoanthraquinone, 1-(4'-diphenylylamino)-4,5- or 8-benzoylaminoanthraquinone, 1-(4'-phenoxyanilino)-4,5- or 8-benzoylaminoanthraquinone, 1-(4'-phenylaminoanilino)-4,5- or 8-benzoylaminoanthraquinone, 1-(4'-benzoylanilino)-4,5- or 8-benzoylaminoanthraquinone, 1-(4'-benzylanilino)-4,5- or 8-benzoylaminoanthraquinone, 1-(4',4''-phenylbenzoylanilino)-4,5- or 8-benzoylaminoanthraquinone, 1-(4',4''-methylbenzoylanilino)-4,5- or 8-benzoylaminoanthraquinone, 1-(4',4''-phenoxybenzoylanilino)-4,5- or 8-benzoylaminoanthraquinone, 1-(4'-phenylsulphonylanilino)-4,5- or 8-benzoylaminoanthraquinone, 1-(4',4''-diphenylylsulphonylanilino)-4,5- or 8-benzoylaminoanthraquinone, 1-(4'-diphenylylamino)-2-phenoxy-4-hydroxyanthraquinone, 1-(4'-phenoxyanilino)-2-phenoxy-4-hydroxyanthraquinone, 1-(4'-phenylaminoanilino)-2-phenoxy-4-hydroxyanthraquinone, 1-(4'-benzoylanilino)-2-phenoxy-4-hydroxyanthraquinone, 1-(4'-benzylanilino)-2-phenoxy-4-hydroxyanthraquinone, 1-(4'-phenoxyanilino)-4,5,8-trihydroxyanthraquinone, 1-(4'-phenylaminoanilino)-4,5,8-trihydroxyanthraquinone, 1-(4'-benzoylanilino)-4,5,8-trihydroxyanthraquinone and 1-(4'-benzylanilino)-4,5,8-trihydroxyanthraquinone.

Preferred anilino-anthraquinone derivatives or phenylmercapto-anthraquinone derivatives are also those of the formula I, wherein n = 1 and A denotes the radical of a more highly condensed anthraquinone derivative, such as 1,9-isothiazolanthrone, 1,9-pyrazolanthrone, 1,9-anthrapyrimidine, 1,9-anthrapyridone or a benzanthrone radical, of which the following examples are mentioned: 5- or 7-anilino-isothiazolanthrone, 5- or 7-(4'-methylanilino)-isothiazolanthrone, 5- or 7-(4'-phenoxyanilino)-isothiazolanthrone, 5- or 7-anilino-pyrazolanthrone, 6,8 or 11-anilinoanthrapyrimidine, 6,8 or 11-(4'-methylanilino)-anthrapyrimidine, 6,8 or 11-(4'-chloroanilino)-anthrapyrimidine, 6,8 or 11-(4'-phenoxyanilino)-anthrapyrimidine, 6,8 or 11-anilino-2-phenyl-anthrapyrimidine, 6,8 or 11-(4'-methylanilino)-2-phenyl-anthrapyrimidine, 6,8 or 11-(4'-chloroanilino)-2-phenyl-anthrapyrimidine, 6,8 or 11-(4'-diphenylylamino)-2-phenyl-anthrapyrimidine, 6,8 or 11-(4'-phenoxyanilino)-2-phenyl-anthrapyrimidine, 6,8 or 11-(4'-phenylaminoanilino)-2-phenyl-anthrapyrimidine, 6,8 or 11-(4'-benzylanilino)-2-phenylanthrapyrimidine, 6,8 or 11-(4',4''-phenoxybenzoylanilino)-2-phenyl-anthrapyrimidine, 6,8 or 11-anilino-2-(4'-toluyl)-anthrapyrimidine, 6,8 or 11-(4'-methylanilino)-2-(4'-chlorophenyl)-anthrapyrimidine, 6,8 or 11-(4'-benzylanilino)-2-(4'-chlorophenyl)-anthrapyrimidine, 6,8 or 11-anilino-2-(4'-diphenylyl)-anthrapyrimidine, 6,8 or 11-(4'-methylanilino)-2-(4'-diphenylyl)-anthrapyrimidine, 6,8 or 11-(4'-phenoxyanilino)-2-(4'-diphenylyl)-anthrapyrimidine, 6,8 or 11-phenylmercapto-(4'-diphenylyl)-anthrapyrimidine, 6,8 or 11-(4'-phenylaminoanilino)-2-(4'-diphenylyl)-anthrapyrimidine, 6,8 or 11-(4'-benzylanilino)-2-(4'-diphenylyl)-anthrapyrimidine, 3-methyl-6-anilino-

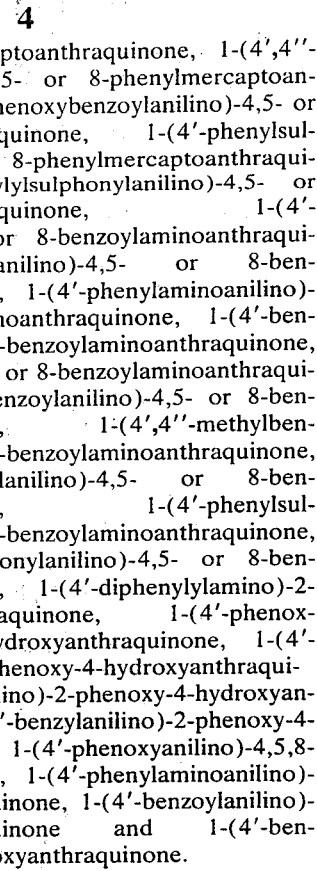

anthrapyridine-2,7-dione, 3-methyl-6-(4'-phenoxyanilino)-anthrapyridine-2,7-dione, 3-methyl-6-(4'-methylanilino)-anthrapyridine-2,7-dione and 3-methyl-6-(4'-phenylaminoanilino)-anthrapyridine-2,7-dione; and also, in particular, anthraquinone derivatives of the formula I wherein $n = 2$, A denotes a mononuclear or more highly condensed anthraquinone radical, and both X's denote a —NH— or —S— bridge, or one X denotes a —NH— bridge and the other X denotes a —S— bridge, such as, for example: 1,4-, 1,5- or 1,8-dianilinoanthraquinone, 1,4-, 1,5- or 1,8-di-(4'-methylanilino)-anthraquinone, 1,4-, 1,5- or 1,8-di-(2'-, 3'-, 2',4'-, 2',5'-, 3',4'- or 3',5'-dimethylanilino)-anthraquinone, 1,4-, 1,5- or 1,8-di-(2',4',5'-trimethylanilino)-anthraquinone, 1,4-, 1,5- or 1,8-di-(2'-ethylanilino)-anthraquinone, 1,4-, 1,5- or 1,8-di-(4'-tert.-butylanilino)-anthraquinone, 1,4-, 1,5- or 1,8-di-(2'-, 3'- or 4'-chloroanilino)-anthraquinone and 1,4-, 1,5- or 1,8-di-(2',3'-, 2',4'-, 2',5'-, 3',4'- or 3',5'-dichloroanilino)-anthraquinone, the mixtures of isomers of bis-dichloroanilino-anthraquinones which are formed in the reaction of 1,4-, 1,5- or 1,8-diaminoanthraquinone with 1,2.4-trichlorobenzene; and 1,4-, 1,5- or 1,8-di-(4'-methoxyanilino)-anthraquinone, 1,4-, 1,5- or 1,8-di-(4'-ethoxyanilino)-anthraquinone, 1,4-, 1,5- or 1,8-di-(4'-β-hydroxyethylanilino)-anthraquinone, 1,4-, 1,5- or 1,8-di-(2'-carboxyanilino)-anthraquinone, 1,4-, 1,5- or 1,8-di-(2'-carboxymethylanilino)-anthraquinone, 1,4-, 1,5- or 1,8-di-(2'-carboxyhydroxyethylanilino)-anthraquinone, 1-(4'-methylanilino)-4-, 5- or 8-(2',3'-, 2',4'-, 2',5'-, 2',6'-, 3',4'- or 3',5'-dimethylanilino)-anthraquinone, 1-(4'-methylanilino)- 4-, 5- or 8-(2',4',5'- or 2',4',6'-trimethylanilino)-anthraquinone, 1-anilino-4-, 5- or 8-(4'-methylanilino)-anthraquinone, 1-(4'-nitroanilino)-4-(4'-methylanilino)-anthraquinone, 1,4-dianilino-5-hydroxyanthraquinone, 1,5-dianilino-4-hydroxyanthraquinone, 1,5-di-(4'-methylanilino)-4-hydroxyanthraquinone, 1,4-dianilino-5,8-dihydroxyanthraquinone, 1,5-dianilino-4,8-dihydroxyanthraquinone, 1,8-dianilino-4,5-dihydroxyanthraquinone, 1,4-di-(4'-methylanilino)-5,8-dihydroxyanthraquinone, 1,5-di-(4'-methylanilino)-4,8-dihydroxyanthraquinone, 1,8-di-(4'-methylanilino)-4,5-dihydroxyanthraquinone, 1,5-dianilino-4,8-diaminoanthraquinone, 1,5-di-(4'-methylanilino)-4,8-diaminoanthraquinone, 1,5-dianilino-4,8-dibenzoylaminoanthraquinone, 1,5-di-(4'-methylanilino)-4,8-dibenzoylaminoanthraquinone, 1,4-, 1,5- or 1,8-di-(4'-diphenylylamino)-anthraquinone, 1,4-, 1,5- or 1,8-di-(4'-phenoxyanilino)-anthraquinone, 1,4-, 1,5- or 1,8-di-(4'-phenylaminoanilino)-anthraquinone, 1,4-, 1,5- or 1,8-di-(4'-benzoylanilino)-anthraquinone, 1,4-, 1,5- or 1,8-di-(4'-benzylanilino)-anthraquinone, 1,4-, 1,5- or 1,8-di-(4'-phenylsulphonylanilino)-anthraquinone, 1,4-di-(4'-benzylanilino)-5-hydroxyanthraquinone, 1,5-di-(4'-phenoxyanilino)-4-hydroxyanthraquinone, 1,5-di-(4'-benzylanilino)-4,8-dihydroxyanthraquinone, 1,4-di-(4'-phenylaminoanilino)-5,8-dihydroxyanthraquinone, 1,5-di-(4'-phenoxyanilino)-4,8-dihydroxyanthraquinone, 1,4-di-(4'-phenoxyanilino)-5,8-dihydroxyanthraquinone, 1,8-di-(4'-phenoxyanilino)-4,5-dihydroxyanthraquinone, 3,9-dianilinobenzanthrone, 3,9-di-(4'-methylanilino)-benzanthrone, 3,9-di-(4'-phenoxyanilino)-benzanthrone, 3,9-di-(4'-phenylaminoanilino)-benzanthrone, 3,9-di-(4'-benzylamino)-benzanthrone, 1,5-dianilino-4,8-diphenylmercaptoanthraquinone, 1,4-, 1,5- or 1,8-diphenylmercaptoanthraquinone, 3,9-diphenylmercaptobenzanthrone, 1,4-di-(2'-carboxyphenylmercapto)-anthraquinone and 1,5- or 1,8-di-(2'-carboxyphenylmercapto)-anthraquinone.

Tri- and tetra-anilinoanthraquinone derivatives should also be mentioned, such as, for example: 1,4,5,8-tetranilinoanthraquinone, 1,4,5,8-tetra-(4'-methylanilino)-anthraquinone, 1,4,5,8-tetra-(4'-phenoxyanilino)-anthraquinone and 1,4,5-trianilino-8-hydroxyanthraquinone.

In the halogenation the halogen atoms enter both into the anilino or arylmercapto radical and into the anthraquinoidal part of the compounds to be halogenated, and new substances or mixtures of substances are formed which, compared with the nonhalogenated starting substances, are distinguished, especially in the bulk dyeing of polyester, by improved dyeing qualities such as a purer and more brilliant shade, higher depth of colour, increased solubility in the polymer, and better fastness to light, chlorite, dry cleaning or sublimation, but particularly better fastness to rubbing after thermofixing. It is possible to prepare various new colouring substances from the same starting material, depending on the degree of halogenation, that is to say to direct the halogenation in such a way that the particular improvement desired in the dyeing properties is achieved.

Halogenoanthraquinone compounds of particular interest for dyeing high molecular compounds are those of the formula IV

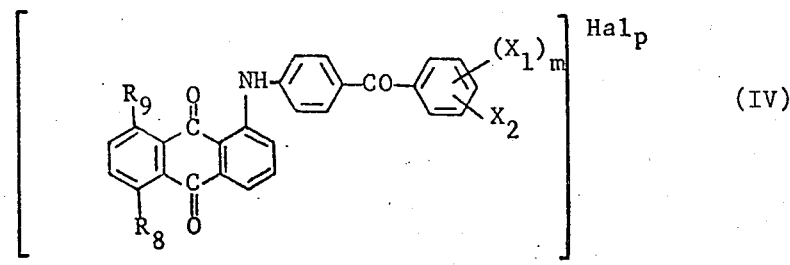

(IV)

wherein $X_1$ denotes hydrogen or a methyl or ethyl group, $X_2$ denotes hydrogen or a propyl, butyl, methoxy, ethoxy, phenyl, naphthyl, benzyl or phenoxy group, $R_8$ and $R_9$ denote hydrogen or methoxy, phenoxy or benzoylamino groups, Hal denotes chlorine or bromine, and $m$ denotes the number 1–3 and $p$ denotes the number 1 or 2.

The following examples may be mentioned of high molecular organic compounds which can be dyed with the dyestuffs which are halogenated in accordance with the invention: cellulose ethers and esters, such as ethylcellulose, nitrocellulose, cellulose acetate and cellulose butyrate, polyamides or polyurethanes, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene and polypropylene, polyacrylonitrile, polyacrylic acid esters, rubber, casein, silicone and silicone resins, individually or as mixtures, but especially linear polyesters.

Linear polyesters which may be mentioned are especially those which are obtained by polycondensation of terephthalic acid or esters thereof with glycols of the formula HO—$(CH_2)_n$—OH wherein $n$ denotes the number 2 - 10, or with 1,4-di(hydroxymethyl)-cyclohexane, or by polycondensation of glycol ethers of hydroxybenzoic acids, for example p-($\beta$-hydroxyethoxy)-benzoic acid. The term linear polyesters also includes copolyesters which are obtained by partially replacing the terephthalic acid by another dicarboxylic acid and/or by partially replacing the glycol by another diol.

However, the polyethylene terephthalates are of particular interest.

The linear polyesters to be dyed, appropriately in the form of powders, chips or granules, are intimately mixed with the dyestuff. This can be carried out, for example, by dusting the polyester particles with the finely divided, dry dyestuff powder or by treating the polyester particles with a solution or dispersion of the dyestuff in an organic solvent and subsequently removing the solvent.

Finally, the substance to be used for dyeing can also be added direct to the fused polyester or can be added before or during the polycondensation of the polyethylene terephthalate.

The ratio of dyestuff to polyester can vary within a wide range, depending on the depth of colour desired. In general it is advisable to use 0.01 - 3 parts of dyestuff to 100 parts of polyester.

The polyester particles treated in this way are melted in the extruder by known processes and are extruded to give articles, especially films or fibres, or are cast to give sheets.

Uniformly and intensely dyed articles with a high fastness to light are obtained. The dyed fibres which can be obtained in accordance with the process are, in addition, distinguished by outstanding fastness to wet processing and dry cleaning.

A particular advantage of the dyestuffs to be used in accordance with the invention consists in the fact that they dissolve in the polyester melt and, surprisingly, withstand high temperatures, up to 300°C, without decomposition, so that significantly clearer dyeings are obtained than when insoluble pigments are used.

In the following examples, unless otherwise specified, the parts denote parts by weight and the percentages denote percentages by weight.

EXAMPLE 1

25.2 parts of 1,5-di-(4'-methylanilino)-anthraquinone are stirred in 300 parts of nitrobenzene and a solution of 21.2 parts of bromine in 100 parts of nitrobenzene is added dropwise over the course of 10–15 minutes. The resulting mixture is then stirred for 18 - 20 hours at room temperature and subsequently for a further 3 hours at 60°C. After cooling, the product is filtered off, washed with a little nitrobenzene and then, thoroughly, with alcohol and is dried in vacuo at 80°C. A red, crystalline product which has a bromine content of 27.5 to 28.5% and dyes polyester in deep, brilliantly bluish-tinged red shades, is obtained in a good yield. The dyeings are distinguished by very good fastness to light, washing, dry cleaning, cross-dyeing and sublimation, but particularly by an excellent fastness to rubbing after the dyed material has been thermofixed at 210°C.

In contrast with this, the non-brominated 1,5-di-(4-methylanilino)-anthraquinone dyes in violet shades having poor fastness properties to rubbing after thermofixing.

EXAMPLE 2

14.8 parts of bromine are added to 9.2 parts of 1,5-di-(4'-chloroanilino)-anthraquinone in 150 parts of nitrobenzene and further treatment is carried out in accordance with Example 1. A purple-coloured, crystalline product is obtained in good yield, which has a bromine content of 38 - 41% and dyes polyester in bluish-tinged red shades of a brilliantly deep colour with outstanding fastness to light and very good fastness properties in other respects, but particularly excellent fastness to rubbing after the dyed material has been thermofixed.

In contrast with this, the non-brominated 1,5-di-(4-chloroanilino)-anthraquinone dyes in claret shades having poor fastness to rubbing after thermofixing.

EXAMPLE 3

94 parts of bromine are added gradually at 20° - 25°C, with stirring, to a suspension of 100 parts of 1,4-di-(4'-methylanilino)-anthraquinone in 1,400 parts of nitrobenzene and the mixture is then stirred for 16 hours at 20° - 25°C and for 1 hour at 60°C. After the reaction mixture has cooled, the reaction product is filtered off and washed with a little nitrobenzene and then with methanol. 131 parts of a dark powder with a 30.2% content of bromine are obtained. The product dyes polyethylene terephthalate, in bulk, in a bluish-tinged green shade. The dyeing exhibits very good fastness to sublimation at 210°C, in contrast with that produced by the starting material.

EXAMPLE 4

A solution of 7.2 parts of bromine in 60 parts of nitrobenzene is added, over the course of one hour and at 20° - 25°C and with stirring, to a suspension of 9.6 parts of 1-(4''-phenyl-4'-benzoyl)-anilinoanthraquinone in 240 parts of nitrobenzene. The reaction mixture, which gradually becomes more viscous, is stirred for 16 hours at 20° - 25°C and is then treated with 80 parts of ethanol. The reaction product which is precipitated is filtered off and washed with ethanol. 10.1 parts are obtained of a product containing 15.9% of bromine. It dyes polyethylene terephthalate, in bulk, in a pure orange-coloured shade with excellent fastness properties. The durability of the shade on treatment by dry heat (210°C, 30 seconds) is distinctly improved, compared with the starting material, which dyes red.

EXAMPLE 5 (DYEING EXAMPLE)

Undelustered polyethylene terephthalate granules, suitable for fibre manufacture, are shaken with 1% of one of the colouring substances described in the preceding examples, in a vessel capable of being closed, for 15 minutes on a shaking machine. The uniformly dyed granules are spun, on a melt-spinning apparatus (285°C ± 3°C, residence time in the spinning machine approx. 5 minutes) into filaments which are stretched on a stretch-and-twist installation and are wound up.

Owing to the solubility of the dyestuffs in polyethylene terephthalate, brilliant dyeings are obtained.

The dyed material can be treated and tested as follows:

a. Thermofixing

A sample of the dyed material is treated for 30 seconds at 210°C in a precision ironing press and is given further fixing treatment for 30 minutes at 135°C.

b. Testing the fastness to rubbing after thermofixing

A dry, undyed cotton or polyethylene terephthalate fabric is moved to and fro across a 10 cm long sample of the dyed and thermofixed material 10 times in a Crockmeter at a pressure of 900 g, over the course of 10 seconds. The staining of the undyed material is assessed.

c. Testing staining during thermofixing

A sample of the dyed material, together with an undyed comparison fabric (polyamide or polyester) is treated in a precision ironing press for 30 seconds at 210°C.

EXAMPLE 6

A suspension of 8.06 parts of 1-(4'-benzoylanilino)-anthraquinone in 330 parts of nitrobenzene is treated with 3.2 parts of bromine at 20°C, with stirring. The resulting suspension is stirred for 17 hours at 25°C and for 5 hours at 65–70°C. After cooling the reaction mixture, the colouring substance is filtered off, washed with alcohol and dried; it contains 16.4% of bromine. It dyes polyethylene terephthalate, in bulk, in an orange-coloured shade with very good fastness properties, especially excellent behaviour in respect of staining an undyed fabric during thermofixing at 210°C. The starting substance, which dyes red, stains a comparison fabric strongly.

EXAMPLE 7

11 parts of 1,5-di-(4''-phenyl-4'-phenylsulphonylanilino)-anthraquinone are suspended in 180 parts of nitrobenzene at 20°C, with stirring, and are treated with 4.4 parts of bromine. The mixture is stirred for 18 hours at 25°C and for 5 hours at 65°C. The colouring substance produced is precipitated by pouring the reaction mixture into 800 parts of ethanol. It contains 9.2% of bromine and dyes polyethylene terephthalate, in bulk, in a claret-coloured shade with excellent fastness properties. The fastness to rubbing after thermofixing is distinctly improved compared with the starting substance.

EXAMPLE 8

3.3 parts of bromine are added, with stirring, at 20°C to a suspension of 9.2 parts of 1,5-di-(2'-chloroanilino)-anthraquinone in 75 parts of nitrobenzene. The mixture is stirred for 15 minutes at 20°–25°C and for 5 hours at 65°C. The colouring substance produced is filtered off, after cooling the reaction mixture, and is washed with a little nitrobenzene and then with ethanol and is dried. It contains 15.3% of bromine and 13% of chlorine and dyes polyethylene terephthalate, in bulk, in a bluish-tinged red shade with very good fastness properties. The fastness to light is distinctly improved compared with the starting substances.

EXAMPLE 9

6.6 parts of bromine are added, with stirring, at 20°C to a suspension of 9.2 parts of 1,5-di-(3'-chloroanilino)-anthraquinone. The mixture is stirred for 22 hours at 25°C and for 6 hours at 70°C. After adding 5 parts of sodium carbonate, the mixture is kept for ¼ hour at 70°C. The colouring substance produced is filtered off, after cooling the suspension to 20°C, and is washed with a little nitrobenzene, and then with ethanol and hot water and is dried. The colouring substance contains 25.3% of bromine and 11.3% of chlorine; it dyes polyethylene terephthalate, in bulk, in a bluish-tinged red shade with very good fastness properties. Compared with the starting substance, which dyes in a claret shade, it exhibits substantially better behaviour in respect of staining a comparison fabric during thermofixing at 210°C.

EXAMPLE 10

84.5 parts of 1,8-diphenylmercaptoanthraquinone are treated with 70.5 parts of bromine in accordance with the instructions of Example 1.

A crystalline, yellow product is obtained, which is shown by analysis to be the dibromo derivative:

| $C_{26}H_{14}O_2S_2Br_2$ | Calculated | S | 11.01% | Br | 27.44% |
|---|---|---|---|---|---|
| | Found | S | 11.10% | Br | 27.20% |

The resulting dyestuff dyes polyester material by the melt-spinning process in greenish-tinged yellow, fast shades; compared with dyeings of the non-brominated material, the dyeings display a lower tendency for staining on thermofixing, particularly in respect of polyamide fabric.

An analogous bromination of equivalent parts of the following phenylmercaptoanthraquinone derivatives gives the dyestuffs listed in the following table, which display the quoted advantages over the starting materials:

| Example | Starting material | Bromine content | Shade | Advantage over starting material |
|---|---|---|---|---|
| 11 | 1,4,5,8-Tetraphenyl-mercapto-anthraquinone | 20–23% | Brilliant pink | Purer shade |
| 12 | 1-(4'-Phenoxyanilino)-5-phenylmercapto-anthraquinone | 24–25% | Red-brown | Better fastness to light |

EXAMPLE 13

84 parts of 1,5-di-(4'-methylanilino)-anthraquinone in 750 parts of nitrobenzene are stirred with 0.5 part of iodine and a solution of 60 parts of sulphuryl chloride in 250 parts of nitrobenzene is added over the course of 30–60 minutes. Thereafter the mixture is stirred for 15 hours at room temperature and then for a further 3 hours at 60°C. The reaction mixture is then freed from nitrobenzene by steam distillation and the dyestuff mass which has separated out is filtered off after cooling, washed with water and then three times with a little alcohol and is dried in vacuo at 60°C. A violet mixture is obtained, which has a chlorine content of 14.5–15.5% and dyes polyester, in bulk, in deep red-violet shades.

Compared with the violet dyeings of the starting material, those of the chlorinated dyestuff have the advantage of better fastness to light and excellent fastness to rubbing after the dyed material has been thermofixed.

If the chlorination is carried out in accordance with the above example using twice the amount of sulphuryl chloride, a dyestuff with a chlorine content of 26–28%, which dyes in a claret shade is obtained, which, compared with the starting material, is distinguished by similar advantages in dyeing.

Corresponding violet dyestuffs are also obtained if 1,5-di-(3'-methylanilino)-anthraquinone is chlorinated according to the above instructions instead of 1,5-di-(4'-methylanilino)-anthraquinone.

What we claim is:

1. Compounds of the formula

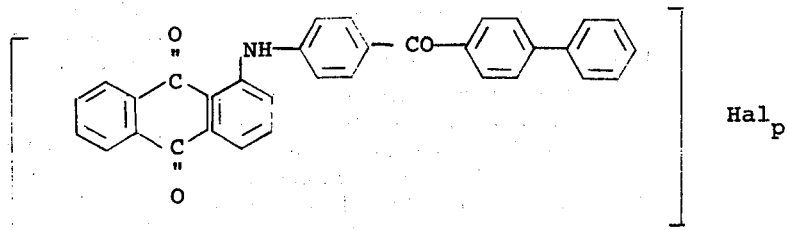

wherein Hal is bromo or chloro and $p$ has a value of 1 to 2.

2. Compounds of the formula

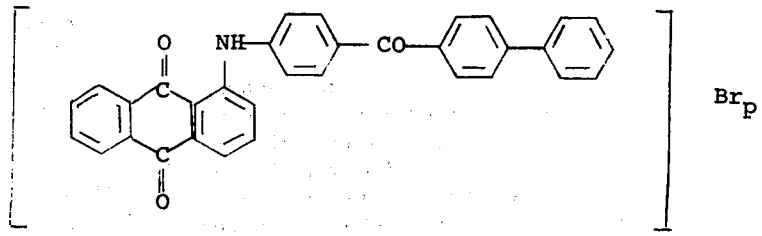

wherein $p$ has a value of 1 to 2.

* * * * *